2 Sheets—Sheet 1.

H. A. GORE & G. W. EDGCOMB.

Assignors, by mesne assignments, to the GOSHEN SWEEPER Co.

Carpet-Sweeper.

No. 8,397. Reissued Sept. 3, 1878.

Witnesses:
C. Clarence Poole
Bartram Geverly

Inventor:
Henry A. Gore
George W. Edgcomb
per Attys A. H. Evans & Co.

H. A. GORE & G. W. EDGCOMB.

Assignors, by mesne assignments, to the GOSHEN SWEEPER Co.

Carpet-Sweeper.

No. 8,397. Reissued Sept. 3, 1878.

Witnesses:
C. Clarence Poole
Bertram Geverly

Inventor:
Henry A. Gore
Geo. W. Edgcomb
per attys.
A. H. Evans & Co.

UNITED STATES PATENT OFFICE.

HENRY A. GORE, OF GOSHEN, AND GEORGE W. EDGCOMB, OF LIMA, ASSIGNORS, BY MESNE ASSIGNMENTS, TO THE GOSHEN SWEEPER COMPANY, OF GOSHEN, INDIANA.

IMPROVEMENT IN CARPET-SWEEPERS.

Specification forming part of Letters Patent No. 187,618, dated February 20, 1877; Reissue No. 8,397, dated September 3, 1878; application filed June 1, 1878.

*To all whom it may concern:*

Be it known that we, HENRY A. GORE, of Goshen, in the county of Elkhart and State of Indiana, and GEORGE W. EDGCOMB, of Lima, in the county of La Grange and State of Indiana, have invented a new and Improved Carpet-Sweeper, of which the following is a clear, full, and exact description, reference being had to the accompanying drawings, making part of this specification, in which—

Figure 1:
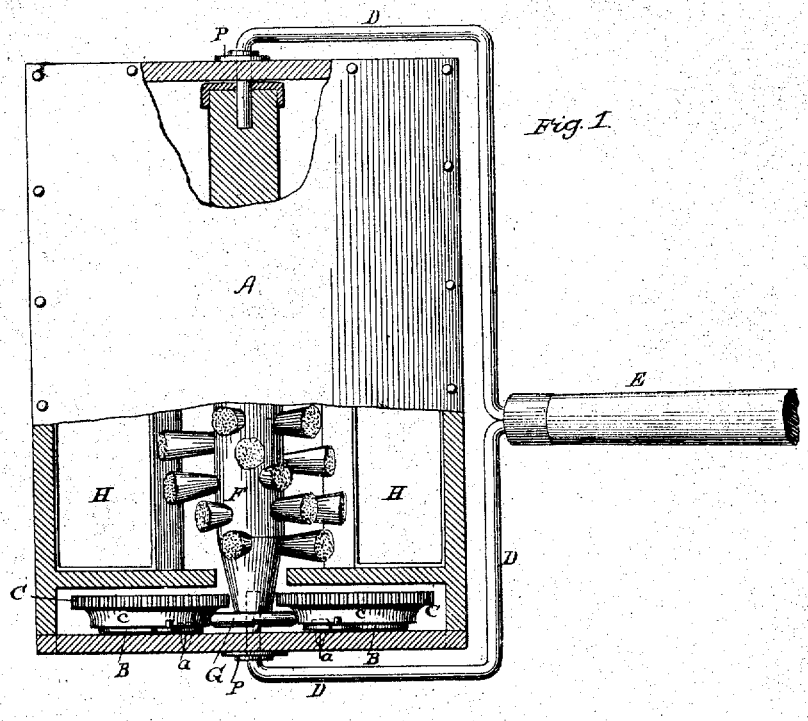
Figure 2:
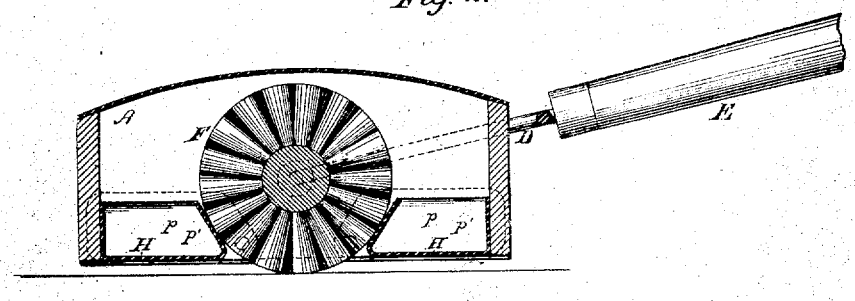
Figure 3:
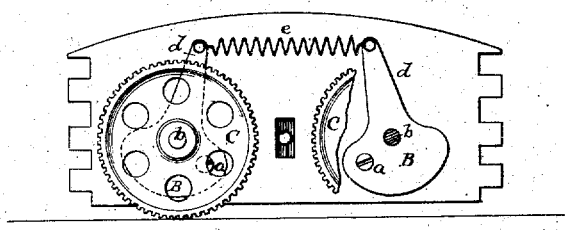
Figure 4:
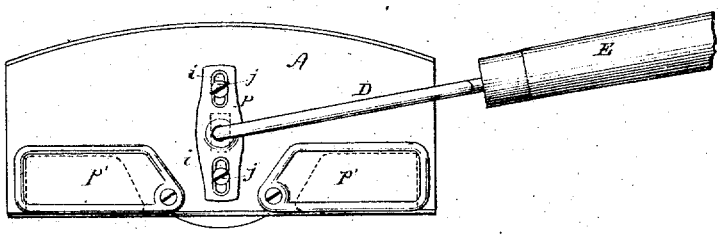

Figure 1 is a plan view with the parts broken away to show the internal construction. Fig. 2 is a transverse section. Fig. 3 is a detailed view of the levers for supporting the driving-wheels. Fig. 4 is an end view.

Our invention relates to that class of sweepers in which the revolving brush is operated by driving-wheels; and it consists in the several combinations of devices hereinafter described and claimed.

Referring to the drawings, A is the casing of the sweeper, to the inner side of one end of which the levers B B are pivoted at *a a*. Studs *b b* project from the levers B, to receive the driving-wheels C C, and are located in relation to the pivots *a* so that a downward pressure on the casing A swings the levers B and causes the wheels C to approach each other. Arms *d* are formed on the levers B, which extend upward to receive the ends of the spring *e*, which tends to draw the arms together.

D is a bail, to which the handle E is attached at one side of the center. The ends of the bail are turned inward and extend through the ends of the casing A, forming pivots, upon which the revolving brush F turns. The end of the brush-shaft is reduced in size, and is provided with a friction-wheel, G, which is engaged by the smooth surface *c* of the driving-wheels C, the said wheels being forced into contact with the friction-wheel G by the action of the levers B. The peripheries of the wheels C are serrated to increase the friction between the carpet and the wheels.

The dust-boxes H are placed on each side of the brush in the casing A, and are soldered or otherwise securely fastened to the iron forming the bottom of the sweeper-box for the purpose of strengthening the sweeper. At the ends of these dust-boxes and through the casing A are the discharge-openings *p p*, provided with the swinging pivoted shutters *p' p'*, which are raised when it is required to empty the dust-boxes, and which fall and retain their position by gravity when the sweeper is being used.

The ends of the bail D, which form the pivots upon which the revolving brush turns, are journaled in the adjustable ears P, provided with the slots *i i*, through which pass the fastening-screws *j j*.

It is evident that by this means the bail may be raised or lowered by the vertical adjustment of the ears, and thus secure any desired vertical adjustment of the revolving brush F, so as to make it press heavier or lighter as it passes over the surface of the carpet. The top of the sweeper, which has heretofore been made removable, we secure permanently to the box, thereby preventing the possibility of any escape of dust from the sweeper.

One end of the sweeper we make removable by springing off the bail. This end, with the gearing attached, can be readily removed for cleaning.

Having thus described our invention, what we claim as new, and desire to secure by Letters Patent, is—

1. The combination of the spring *e* with the levers B and wheels C C, substantially as shown and described.

2. The handle E and bail D entering the end of the brush, in combination with the adjustable slotted ears P and revolving brush F, all combined substantially as and for the purpose set forth.

3. In a carpet-sweeper, a removable end having the gearing attached thereto, substantially as and for the purpose set forth.

4. The bail D, provided with its extended bent ends, forming pivots for the brush-shaft, in combination with the revolving brush F, substantially as and for the purpose set forth.

HENRY A. GORE.
GEORGE W. EDGCOMB.

Witnesses:
WM. TAYLOR,
WM. H. DE PUY.